United States Patent
Yeh et al.

(10) Patent No.: US 8,603,379 B2
(45) Date of Patent: Dec. 10, 2013

(54) BEZEL ASSEMBLY AND MANUFACTURING METHOD

(75) Inventors: Chin-Wen Yeh, New Taipei (TW); Yang Xiao, Hubei (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 129 days.

(21) Appl. No.: 13/282,735

(22) Filed: Oct. 27, 2011

(65) Prior Publication Data
US 2013/0002105 A1    Jan. 3, 2013

(30) Foreign Application Priority Data
Jun. 28, 2011   (CN) ............... 2011 1 0176149

(51) Int. Cl.
*B29C 45/16* (2006.01)

(52) U.S. Cl.
USPC ............... 264/275; 264/405; 425/DIG. 33

(58) Field of Classification Search
USPC ........... 425/DIG. 33; 264/259, 275, 405, 478, 264/484
See application file for complete search history.

(56) References Cited

U.S. PATENT DOCUMENTS 7,641,458 B2 * 1/2010 King ................. 425/3
2011/0268924 A1 * 11/2011 Dickens .............. 428/156

FOREIGN PATENT DOCUMENTS

JP         01-192517      * 8/1989

* cited by examiner

*Primary Examiner* — Jill Heitbrink
(74) *Attorney, Agent, or Firm* — Altis Law Group, Inc.

(57) ABSTRACT

A manufacture method for a bezel assembly through an injecting molding machine includes the following steps. A metal front wall is placed on a male mold of the injecting molding machine. The metal front wall is attracted to the male mold. A female mold is coupled onto the male mold. Liquid plastic material is injected onto the metal front wall through the female mold. The female mold is removed from the male mold after the liquid plastic material is substantially solidified to a plastic bezel on the metal front wall. The attraction force is removed from the metal front wall. The bezel assembly is lift from the male mold.

4 Claims, 9 Drawing Sheets

BEZEL ASSEMBLY AND MANUFACTURING METHOD

CROSS-REFERENCE TO RELATED APPLICATIONS

Relevant subject matter is disclosed in U.S. patent applications entitled "INJECTING MOLDING MACHINE FOR METAL COMPONENT", U.S. application Ser. No. 13/282737, Filed on Oct. 27, 2011.

BACKGROUND

1. Technical Field

The present disclosure relates to a bezel assembly, a method for manufacturing the bezel assembly, and an injecting molding machine for the bezel assembly.

2. Description of Related Art

Enclosures of electronic devices, such as computer enclosures usually include plastic bezels and metal front walls. Many plastic bezels are mounted by screws or by some other common locking devices to the metal front walls. When the bezel is mounted to the metal front wall, the bezel has to be aligned with the front wall first, and then the bezel is screwed to the front wall. However, the computer enclosure will not be tightly assembled if the bezel is staggered relative to the front wall. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

One embodiment of a bezel assembly may be an ornamental bezel assembly of a computer and may be manufactured by an injecting method.

Referring through FIG. 1 to FIG. 4, in one embodiment, a bezel assembly includes a bezel 100 and a front wall 200. The bezel 100 is made of plastic. The front wall 200 comprises ferromagnetic materials, such as iron, and can be attracted by magnets. The bezel 100 is solidified or molded on the front wall 200 through cooling melt plastic.

Figure 1:
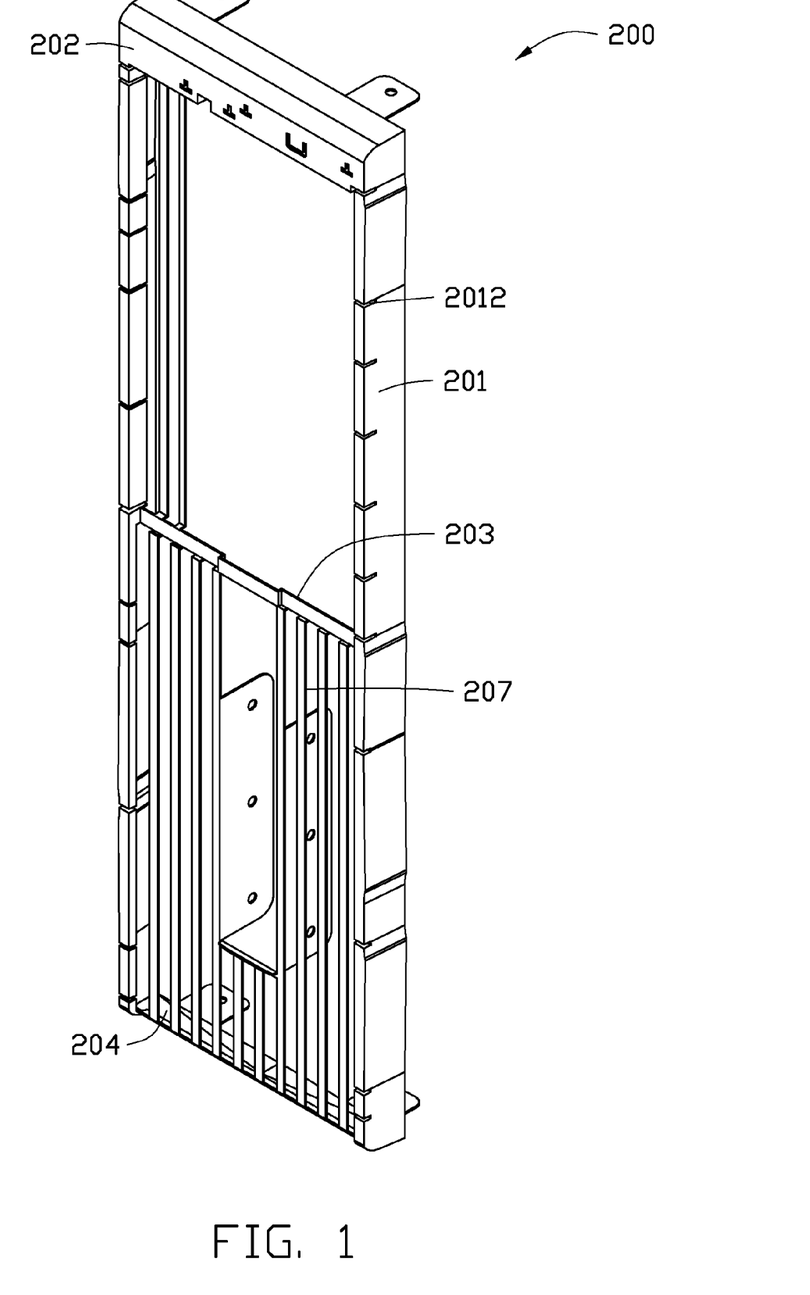
FIG. 1 is an isometric view of a front wall according to one embodiment.
Figure 2:
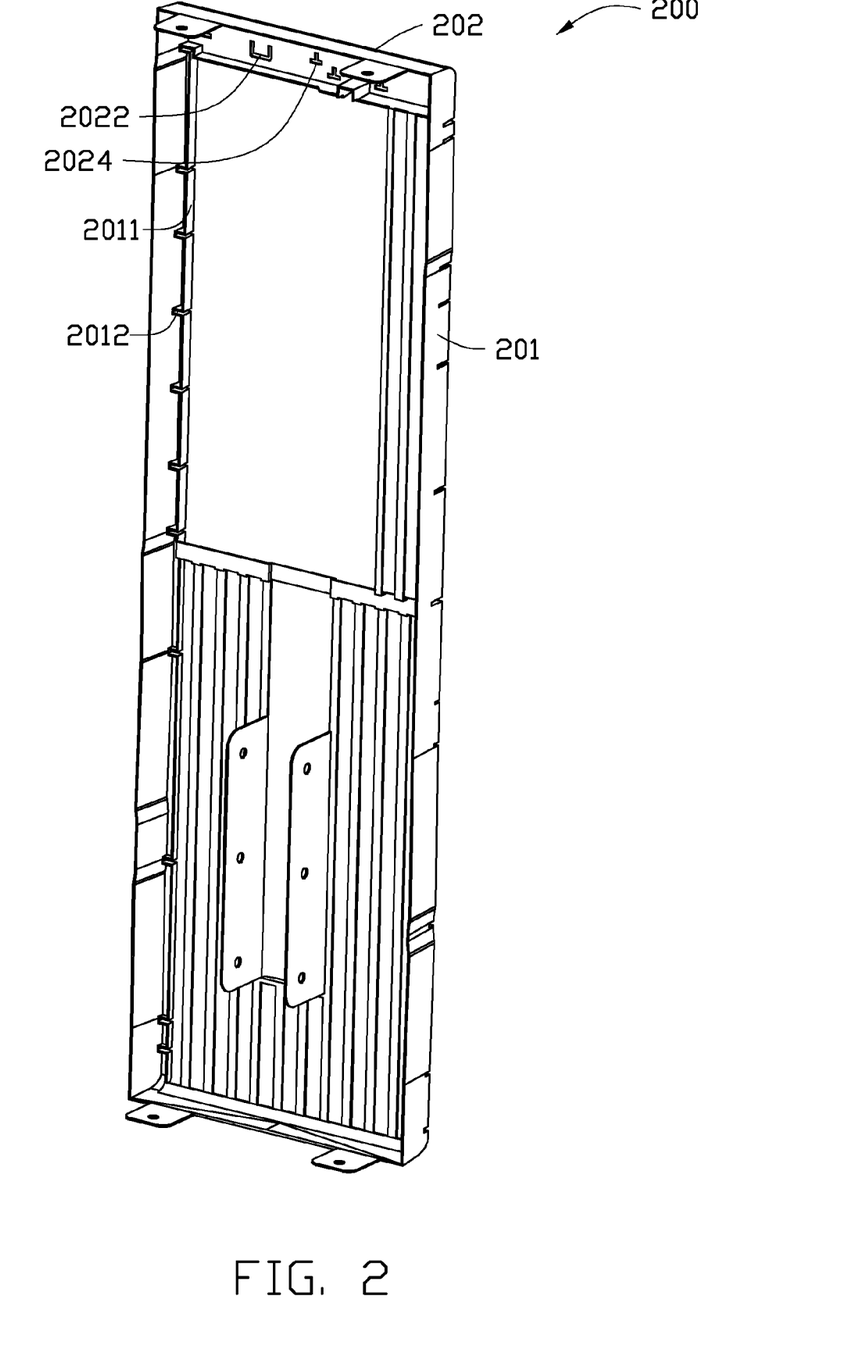
FIG. 2 is another isometric view of the front wall of FIG. 1.

The front wall 200 includes two parallel side flanges 201, a frame bar 2011 located at an inner side of each of the parallel side flanges 201, a top flange 202, a cross bar 203, a bottom flange 204, a plurality of ribs 207 connecting the cross bar 203 to the bottom flange 204. The top flange 202 and the cross bar 203 are substantially located on a first plane. The first plane is substantially perpendicular to the two parallel side flanges 201. A U-shaped first retaining slot 2022 and a plurality of T-shaped second retaining slots 2024 are defined in the top flange 202. A plurality of recesses 2012 is defined in the frame bar 2011. The recesses 2012 extend substantially perpendicular to the side flanges 201. The front wall 200 may be manufactured by stamping.

Figure 3:
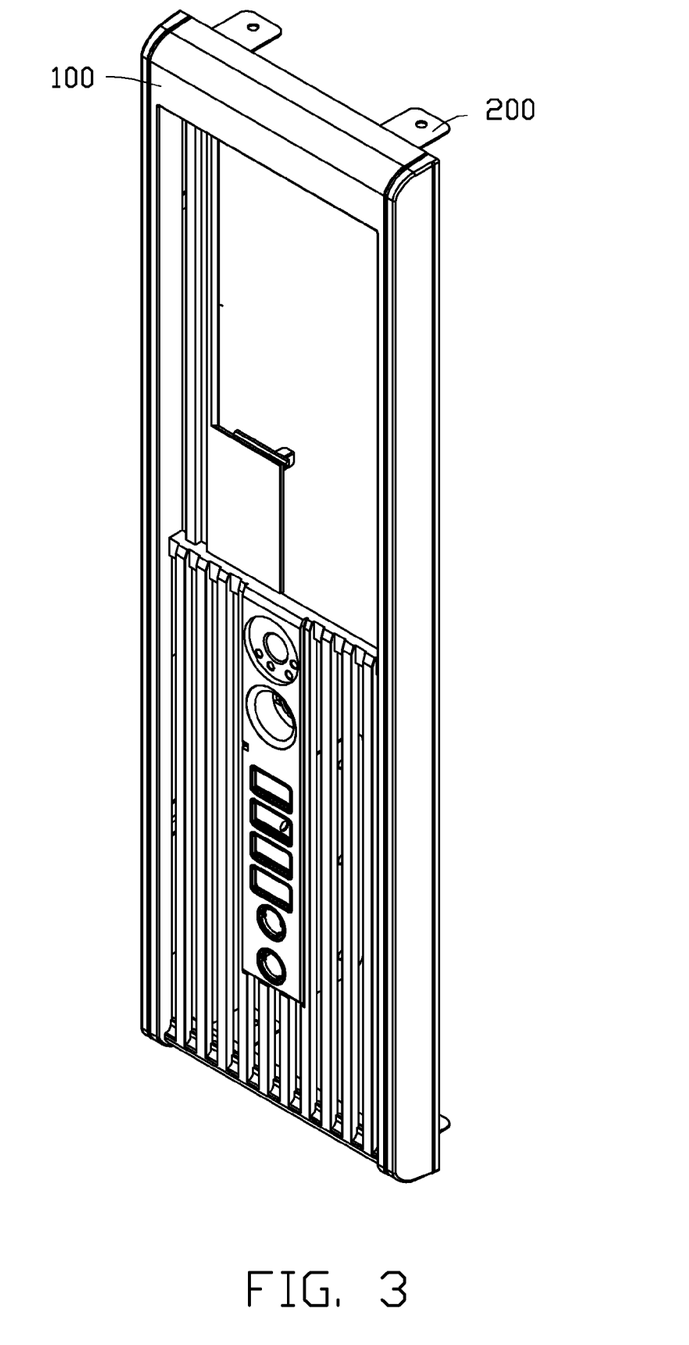
FIG. 3 is an isometric view of a bezel assembly according to one embodiment.
Figure 4:
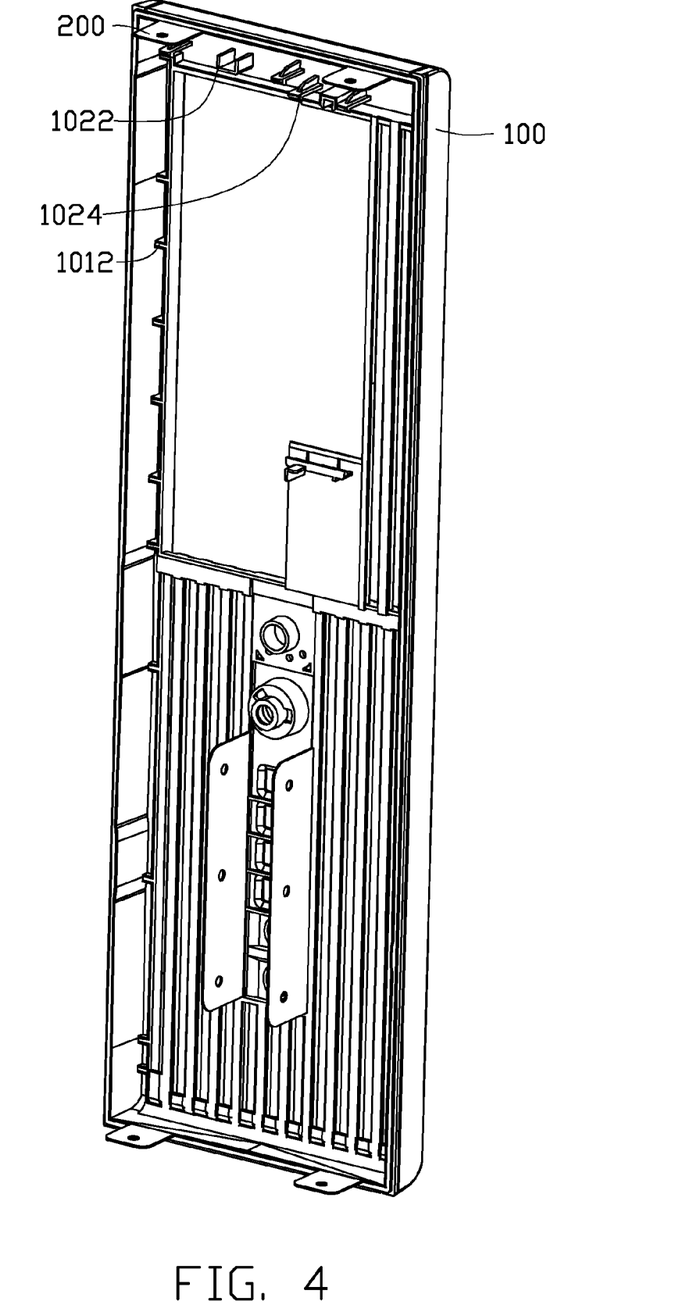
FIG. 4 is another isometric view of the bezel assembly of FIG. 3.

The bezel 100 substantially covers one side of the front wall 200. The bezel 100 includes a U-shaped first retaining portion 1022 and a plurality of T-shaped second retaining portions 1024. The U-shaped first retaining portion 1022 and the plurality of T-shaped second retaining portions 1024 extend through the U-shaped first retaining slot 2022 and the plurality of T-shaped second retaining slots 2024. The bezel 100 further includes a plurality of stiffeners 1012 extending into the recesses 2012 of the front wall 200.

In one embodiment, an injecting molding machine 500 may be used to manufacture the bezel assembly and other metal component assembled with the plastic component.

Referring to FIG. 5 through FIG. 9, in one embodiment, the injecting molding machine 500 may include a male mold 510 and a female mold 550.

Figure 5:
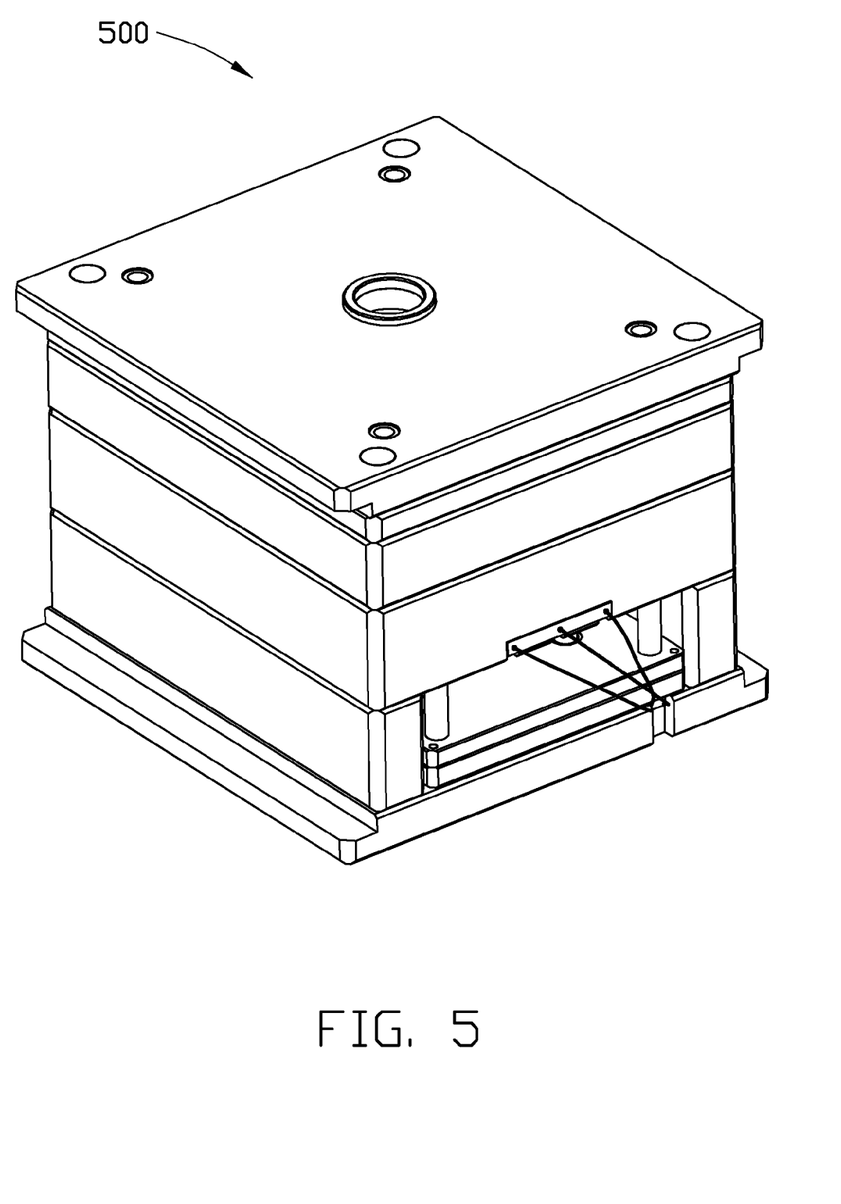
FIG. 5 is an assembled, isometric view of an injection machine in one embodiment.
Figure 6:
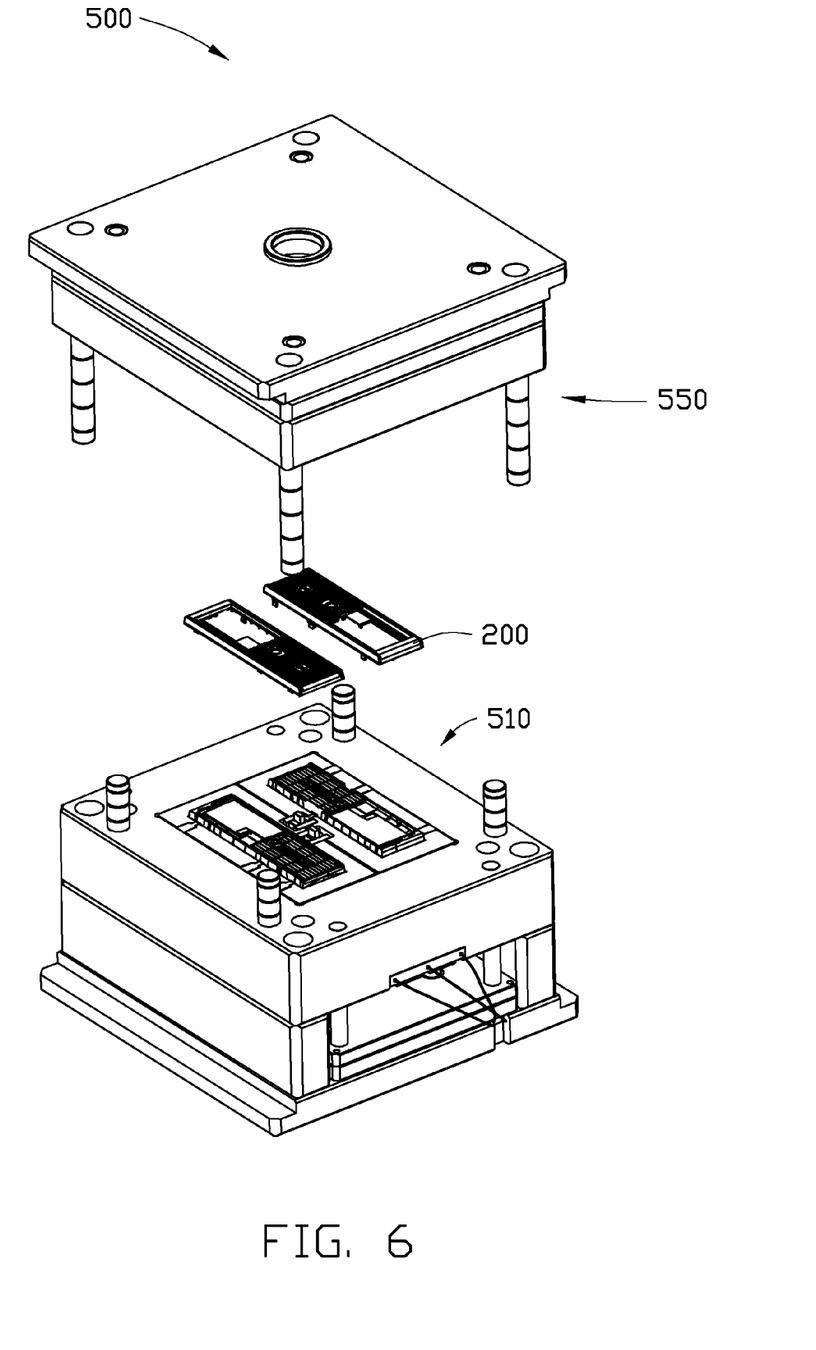
FIG. 6 is an exploded, isometric view of the injection machine of FIG. 5 and two bezel assemblies of FIG. 3.
Figure 7:
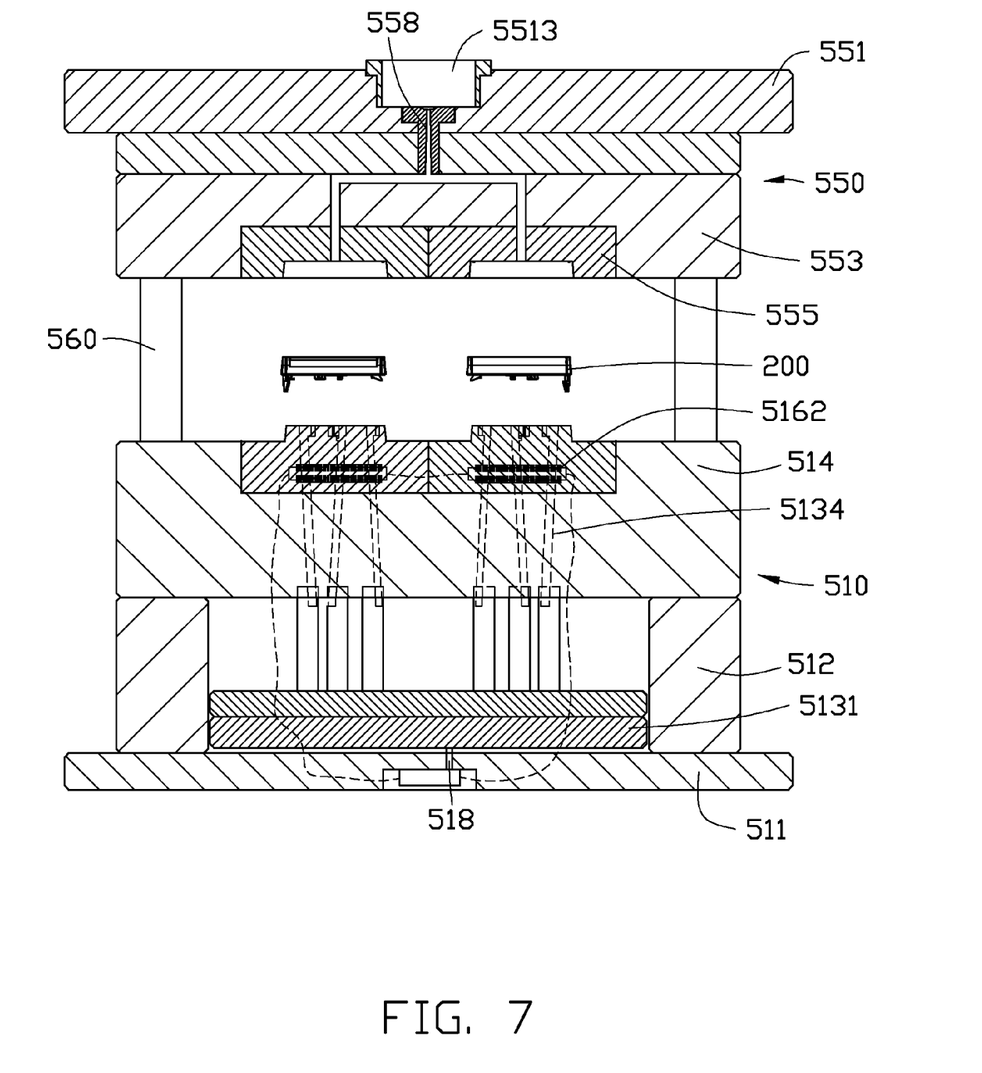
FIG. 7 is a cross-sectional view the injection machine of FIG. 6 and two front bezels.

The male mold 510 includes a bottom plate 511, two stands 512 located on the bottom plate 511, a lifting device 513 movable relative to the bottom plate 511, a male mold seat 514, and two male mold cores 516 located on the male mold seat 514. The lifting device 513 includes a lifting board 5131, a plurality of steady pins 5132 located on the lifting board 5131 and a plurality of pushing pins 5134 pivotally connected to the steady pins 5132. The bottom plate 511, the stands 512 and the male mold seat 514 define a movement space (not labeled). The lifting board 5131 is located in movement space. The plurality of pushing pins 5134 are urged and biased to a moving direction of the lifting board 5131. An electronic magnet 5162 is located in each of the male mold cores 516. A switch 518 is located on the bottom plate 511 to control power of the electronic magnet 5162. The switch 518 connects to the electronic magnet 5162 through a wire 5182. The switch 518 may be a touch-control switch or a sense-control switch. The touch-control switch may extend into the movement space. The sense-control switch may detect the positions of the lifting board 5131. The switch 518 may control an embedded battery 519 or an external power to the electronic magnet 5162.

The female mold 550 includes a top plate 551, a female mold seat 553 and two female mold cores 555 located on the female mold seat 553. Each of the female mold cores 555 defines a mold cavity. An input mouth 5513 and a channel 558 are defined to communicate with and the mold cavity. The female mold 550 further includes at least one guiding pole 560.

Figure 8:
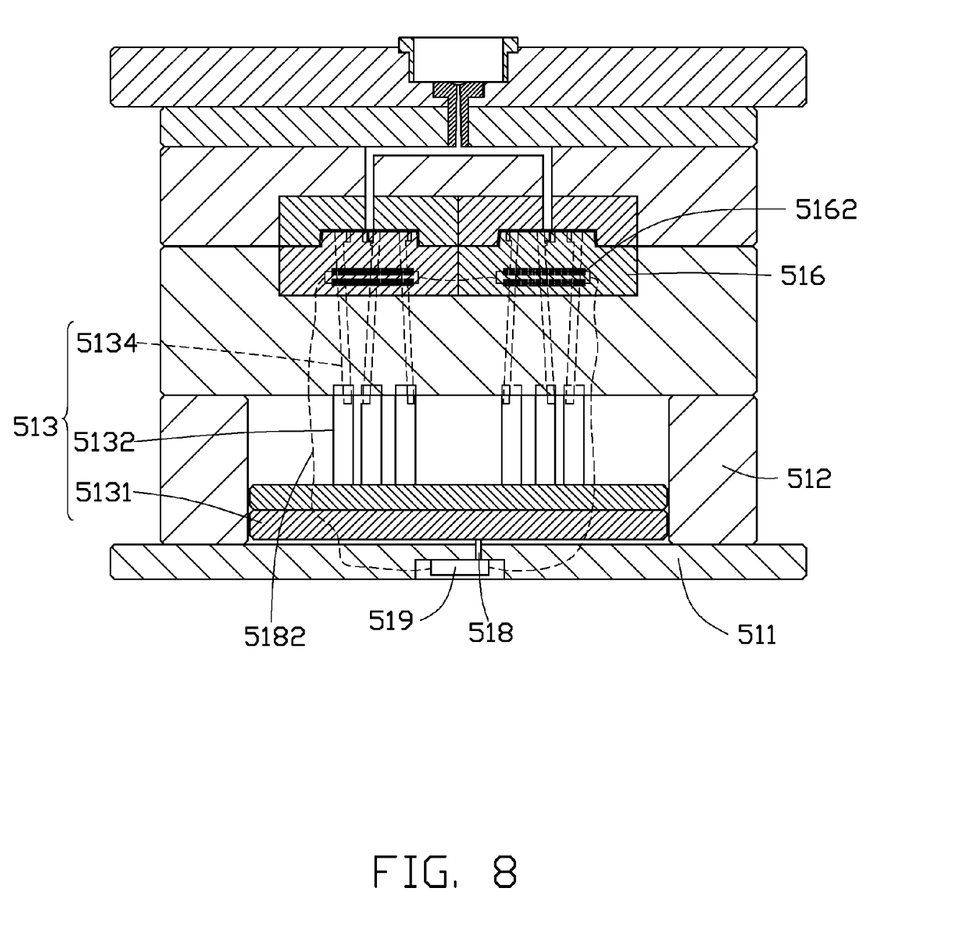
FIG. 8 is similar to FIG. 7, but a male mold and a female mold are coupled.
Figure 9:
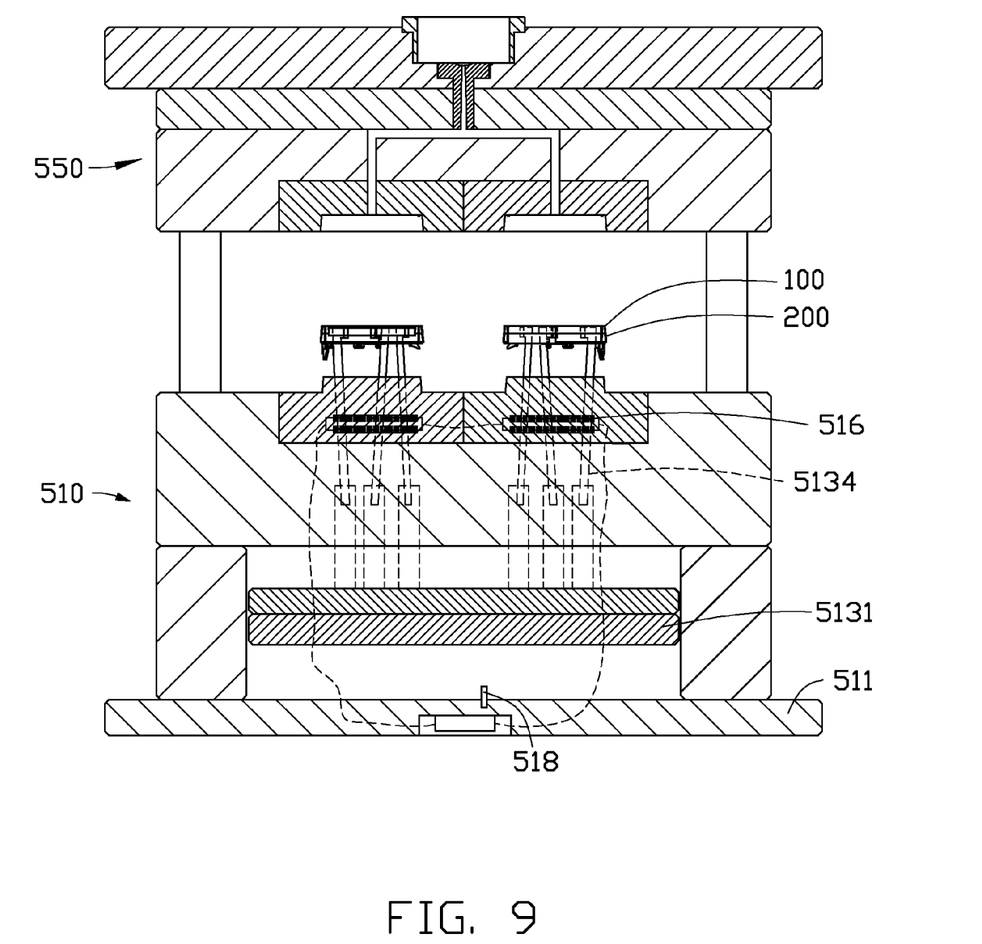
FIG. 9 is similar to FIG. 7, but the female mold is moved away from the male mold and two bezel assemblies are ejected.

Referring to FIG. 8 and FIG. 9, in one embodiment, when manufacturing the bezel assembly by the injecting molding machine 500, two male mold cores 516 and touch-control switch are used, two front walls 200 are put in the male mold cores 516. The lifting board 5131 presses the switch 518 to supply power to the electronic magnets 5162. The electronic magnets 5162 attract the front walls 200 to the male mold cores 516. The female mold 550 moves down to couple with the male mold 510. Liquid plastic material is injected onto the front wall 200 through the input mouth 5513 and the channel 558. The liquid plastic material is solidified to a bezel 100 on the front wall 200. The female mold 550 is moved upward away from the male mold 510. The lifting plate 5131 is moved in the movement space, and the switch 518 is released. The switch 518 cuts off the power of the electronic magnets 5162 and the attraction force of the bezel assembly is released. The pushing pins 5134 push the bezel assembly away from the male mold cores 516 when the lifting board 5131 is moved upward.

In other embodiments, when the sense-control switch is used, the sense-control switch may detect positions of the lifting board 5131 to control power to the electronic magnets 5162.

It is also to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A manufacture method, comprising:
   placing a metal front wall on the male mold of the injecting molding machine with an attaching surface of the metal front wall exposed outside;
   attracting the metal front wall to the male mold;
   coupling the female mold onto the male mold with a cavity defined in the female mold enclosing by the attaching surface of the metal front wall;
   injecting liquid plastic material into the cavity of the female mold;
   removing the female mold from the male mold after the liquid plastic material is substantially solidified to a plastic bezel on the metal front wall to form a bezel assembly;
   releasing attracting force from the metal front wall; and
   lifting the bezel assembly from the male mold,
   wherein the attracting of the metal front wall comprises attracting the metal front wall through an electronic magnet located inside the male mold, wherein the male mold comprises a lifting device, a touch switch is pressed by the lifting device when the metal front wall is in contact with the male mold; and the release of the attracting force from the metal front wall comprises moving the lifting device and releasing the touch switch to cut off power to the electronic magnet.

2. The manufacture method of claim 1, wherein the plastic bezel is coated on one side of the metal front wall.

3. A manufacture method, comprising:
   placing a metal front wall on a male mold of the injecting molding machine;
   attracting the metal front wall with to the male mold;
   coupling a female mold onto the male mold;
   injecting liquid plastic material onto the metal front wall through the female mold;
   removing the female mold from the male mold after the liquid plastic material is substantially solidified to a plastic bezel on the metal front wall to form a bezel assembly;
   releasing attracting force from the metal front wall; and
   lifting the bezel assembly from the male mold,
   wherein the attracting of the metal front wall comprises attracting the metal front wall through an electronic magnet located inside the male mold, the male mold comprises a lifting device, a touch switch is pressed by the lifting device when the metal front wall comes in contact with the male mold; and the release of the attracting force from the metal front wall comprises moving the lifting device and releasing the touch switch to cut off power to the electronic magnet.

4. The manufacture method of claim 3, wherein the plastic bezel is coated on one side of the metal front wall.

* * * * *